US009039927B2

(12) United States Patent
Eichfelder et al.

(10) Patent No.: US 9,039,927 B2
(45) Date of Patent: May 26, 2015

(54) ETHERIFIED MELAMINE/FORMALDEHYDE CONDENSATES HAVING A HIGH SOLID CONTENT AND LOW VISCOSITY

(75) Inventors: Andreas Eichfelder, Maxdorf (DE); Rainer Erhardt, Shanghai (CN); Martin Reif, Römerberg (DE); Eva Ruba, Mannheim (DE); Günter Scherr, Ludwigshafen (DE); Jörg Schneider, Wezembeek-Oppern (BE); Dieter Weilacher, Haßloch (DE)

(73) Assignee: BASF SE (DE)

( * ) Notice: Subject to any disclaimer, the term of this patent is extended or adjusted under 35 U.S.C. 154(b) by 692 days.

(21) Appl. No.: 12/096,502

(22) PCT Filed: Dec. 7, 2006

(86) PCT No.: PCT/EP2006/069409
§ 371 (c)(1),
(2), (4) Date: Jun. 6, 2008

(87) PCT Pub. No.: WO2007/065922
PCT Pub. Date: Jun. 14, 2007

(65) Prior Publication Data
US 2009/0121181 A1 May 14, 2009

(30) Foreign Application Priority Data
Dec. 9, 2005 (DE) .......................... 10 2005 058 855

(51) Int. Cl.
*C09K 3/00* (2006.01)
*C08F 2/00* (2006.01)
*C08G 12/42* (2006.01)

(52) U.S. Cl.
CPC ................... *C08G 12/427* (2013.01)

(58) Field of Classification Search
USPC ....... 252/182.13; 260/17.3; 528/254; 526/61, 526/71
See application file for complete search history.

(56) References Cited

U.S. PATENT DOCUMENTS

| 2,998,411 | A | * | 8/1961 | Housekeeper | ................. 526/61 |
| 4,081,426 | A | | 3/1978 | Michel et al. | |
| 4,101,520 | A | | 7/1978 | Boldizar | |
| 4,183,832 | A | * | 1/1980 | Meunier et al. | .............. 523/344 |
| 4,223,141 | A | | 9/1980 | Honel et al. | |
| 4,425,466 | A | | 1/1984 | Santer et al. | |
| 5,047,466 | A | | 9/1991 | Busse et al. | |
| 2006/0252909 | A1 | | 11/2006 | Pfeiffer et al. | |
| 2010/0113693 | A1 | * | 5/2010 | Schneider et al. | .............. 525/53 |

FOREIGN PATENT DOCUMENTS

| CA | 2 559 892 | | 7/2005 |
| DE | 25 16 349 | | 10/1976 |
| DE | 32 16927 | | 11/1983 |
| DE | 100 07 951 | | 9/2000 |
| DE | 102 61 804 | | 7/2004 |
| DE | WO2005068441 | * | 7/2005 |
| EP | 0 008 683 | | 3/1980 |
| EP | 0 385 225 | | 9/1990 |
| GB | 1030268 | | 5/1966 |
| WO | WO-01/60882 | | 8/2001 |
| WO | WO-0160882 A1 | | 8/2001 |
| WO | WO-2005/068441 | | 7/2005 |
| WO | WO2005068441 | * | 7/2005 |
| WO | WO-2006131456 A1 | | 12/2006 |
| WO | WO-2006131486 A1 | | 12/2006 |
| WO | WO-2007014900 A1 | | 2/2007 |
| WO | WO-2008148766 A1 | | 12/2008 |

OTHER PUBLICATIONS

Houben-Weyl, Methoden Der Organischen Chemie, Band XIV/2, pp. 319-402.
Ullmanns Encyklopadie der technischen Chemie, 1953, 3.Band, pp. 487-489.
U.S. Appl. No. 11/916,594.
U.S. Appl. No. 11/916,626.
U.S. Appl. No. 11/916,747.
U.S. Appl. No. 12/097,273.
E.J. Akota et al. in Advanced Materials 2004, 16, No. 12, pp. 985 to 989.
W. Zang et al., J. Am. Chem. Soc. 2001, 123, 8914 to 8922.
E.J. Akosta et al., Journal of Polymer Science: Part A: Polymer Chemistry, vol. 43, 168 to 17 (2005).
W. Zang et al., Macromolecules 2002, 35, 9015 to 9021.
Zhang et al., Polymer Preprints, American Chemical Society, US, p. 1579.

* cited by examiner

*Primary Examiner* — Monique Peets
(74) *Attorney, Agent, or Firm* — Drinker Biddle & Reath LLP

(57) ABSTRACT

Process for the preparation of etherified melamine/formaldehyde condensates, in which first a methylolation of melamine with a formaldehyde component in the molar ratio of from 1:6 to 1:15, preferably at a pH of >7, is carried out. This is followed by an etherification of the resulting hydroxymethylation intermediate in the presence of a $C_1$-$C_{20}$-alkyl, preferably of a $C_1$-$C_6$-alcohol, particularly preferably of a $C_1$-$C_4$-alcohol, at a pH of <4.5, and subsequently by at least one distillation step in order to remove in particular methanol from the system, the pH of >9.5 being established before, during and/or after the distillation. According to the invention, a plurality of hydroxymethylation, etherification and distillation steps follow in order to achieve an etherified melamine/formaldehyde condensate which is distinguished by a high degree of hydroxymethylation, a high solids content and a low viscosity.

18 Claims, No Drawings

ETHERIFIED MELAMINE/FORMALDEHYDE CONDENSATES HAVING A HIGH SOLID CONTENT AND LOW VISCOSITY

CROSS REFERENCE TO RELATED APPLICATIONS

This application is a National Phase filing under 35 U.S.C. §371 of PCT/EP2006/069409 filed Dec. 7, 2006, which claims priority to Patent Application No. 102005058855.7, filed in Germany on Dec. 9, 2005. The entire contents of each of the above-applications are incorporated herein by reference.

The invention relates to a process for the preparation of etherified melamine/formaldehyde condensates, the etherified melamine/formaldehyde condensates and the use thereof. In particular, it relates to a suitable process which influences the proportion of mononuclear components having a degree of substitution of <6 in the etherified melamine/formaldehyde condensates, with the result that their structures, reactivities and viscosities can be influenced. Here, a mononuclear component designates a melamine molecular building block and degree of substitution designates the number of hydrogen atoms of the amine groups of the melamine molecular building block (melamine ring) which are exchanged by reaction with formaldehyde.

Etherified melamine/formaldehyde condensates are known and are described, for example, in Houben-Weyl, Methoden der organischen Chemie, Volume XIV-2, 1963, pages 319 to 402, and in Ullmann's Encyclopädie der Technischen Chemie, 1953, Volume 3, pages 487 to 489; melamine resin, melamine resin condensates or melamine/formaldehyde resin condensates is also used as a synonymous term.

The industrial demand for etherified melamine/formaldehyde condensates has greatly increased. Frequently, etherified melamine/formaldehyde condensates are used as an aminoplast crosslinking agent in coating combinations, as crosslinking agents for lattices and dispersion binders containing hydroxyl groups, for the production of pressed mats, as a constituent of watertight adhesives for gluing veneer, in the production of laminates, edge bands and in surface shaping of sheet material. Etherified melamine/formaldehyde condensates are also used in the paper industry for impregnating and coating of paper.

For the diverse application in the abovementioned areas, surface hardness, scratch resistance, dry heat stability, resistance to water vapor, adhesive strength and resilience of the melamine resins formed and cured by a curing process effected by the action of acid and/or heat are desired.

The preparation of etherified melamine/formaldehyde condensates is disclosed, for example, in DE-A 25 16 349 and U.S. Pat. No. 4,425,466, melamine being reacted with formaldehyde and alcohols in the presence of strong organic acids at from 80 to 130° C.

In addition, the prior art discloses a number of preparation processes for melamine/formaldehyde resin condensates, which processes were based on different requirements. Thus, DE-1 102 61 804 describes a direct synthesis process for the preparation of melamine resin condensates having an average molar mass of from 500 to 50 000, which are free of hydroxy methylene amino groups bonded to the triazine rings and of —NH—$CH_2$—O—$CH_2$—NH— groups linking the triazine rings.

Other publications, for example DE-A 100 07 951 and EP-A 0 385 225 relate to storage stabilities of the melamine/formaldehyde condensates or the conductivity thereof and the suitability thereof for the coating of wood-base materials.

DE-A 32 16 927 describes a solution of melamine resins which are composed of at least 80% by weight of melamine and formaldehyde in the molar ratio of from 1:1.5 to 1:4 and which comprise from 1 to 20% by weight, based on the solids content of the melamine resin of an alkali metal disulfite. Here, example 1 recommends monitoring viscosity occurring in the condensation of the melamine and of the formaldehyde to give the melamine resins an aqueous solution. The melamine resins thus produced, which are recommended for the production of filaments and fibers, have a viscosity of more than 10 000 mPa·s.

It is an object of the present invention to provide a process for the production of etherified melamine/formaldehyde condensates which are distinguished in particular by a high solids content and a low viscosity.

The object is achieved by a process for the preparation of etherified melamine/formaldehyde condensates, in which (a) in a first reaction step, a methylolation of melamine with a formaldehyde component in the molar ratio of from 1:6 to 1:15 is carried out;

(b) in a second reaction step, an etherification of the hydroxymethylation intermediate resulting from step (a) is carried out in the presence of a $C_1$-$C_{20}$-alkyl, preferably of a $C_1$-$C_6$-alcohol and particularly preferably of a $C_1$-$C_4$-alcohol, at a pH of <4.5;

(c) in a third reaction step, the reaction mixture from step (b) is adjusted to a pH of >9.5 by addition of an inorganic base and volatile constituents, in particular methanol, are removed by at least one distillation step;

(d) the reaction steps (b) and (c) are repeated at least once.

By using the formaldehyde in excess in the process according to the invention for the preparation of melamine/formaldehyde condensates, the hydroxymethylation is possible in all reaction steps. The melamine/formaldehyde condensates prepared according to the invention have a high degree of hydroxymethylation and of etherification. Moreover, there is a relationship between degree of etherification and viscosity. Melamine/formaldehyde condensates having a small proportion of mononuclear components with a degree of substitution close to 6 have a small proportion of unsubstituted amino groups and exhibit advantageous viscose properties.

In the process according to the invention, melamine is preferably used as a solid. For the methylolation, a formaldehyde component, for example formaldehyde or a mixture of formaldehyde, water and methanol, for example having a proportion of 50% by weight of formaldehyde, from 0 to 10% by weight of water and from 40 to 50% by weight of methanol, is used. Preferably, the formaldehyde is used in the form of a 30 to 85% strength by weight, preferably from 40 to 60% strength by weight, aqueous solution or in the form of paraformaldehyde. Here, advantageously from 6 to 15 mol, preferably from 7 to 10 mol, of formaldehyde are used per mole of melamine.

The methylolation of melamine is expediently effected at temperatures of from 40 to 100° C., preferably from 60 to 85° C. The methylolation of the melamine may start when the latter is mixed with formaldehyde components, it initially not being necessary to change the pH, which is in the acidic range. Preferably, the methylolation is carried out at a pH of >7, preferably at a pH of from 8 to 10. The pH can be established using an inorganic bases for example sodium hydroxide solution or potassium hydroxide solution, or amines, for example monoethanolamine or triethyleneamine. If appropriate, the batch is buffered, for example with Borax. The methylolation preferably takes place at atmospheric pressure, it also being possible to carry it out under pressure, in general at a pressure of from 0.5 to 10 bar.

In the subsequent second reaction step, i.e. the first esterification stage, the hydroxymethylation intermediate obtained from the methylolation stage is etherified at a pH of <4.5 in the presence of a $C_1$-$C_{20}$-alcohol, preferably of a $C_1$-$C_6$-alcohol, particular preferably of a $C_1$-$C_4$-alcohol. Methanol is: preferably used as the alcohol for the etherification. Here, for example, the hydroxymethylation intermediate can be added to acidic methanol—i.e. a methanol/water mixture having an acidic pH—with a preferred methanol excess in the melamine:methanol ratio of from 1:7 to 1:50, preferably 1:7 to 1:25, per etherification step. Alternatively, the hydroxymethylation intermediate can be added to methanol, and the pH adjusted to the pH of <7, preferably to a pH in the range from 2.5 to 3.5, only by addition of a suitable acid, for example $HNO_3$, $H_2SO_4$, HCl or methanesulfonic acid.

The etherification preferably takes place at temperatures from 40 to 120° C., preferably from 50 to 80° C., and prevailing pressures of from 0.5 to 10 bar, preferably 1 to 3 bar. The reaction time may be varied from 10 to 120 minutes, and is preferably from 20 to 60 minutes.

Alternatively, the methylolation and etherification step can be combined into one reaction step, the temperature being the range from 40 to 150° C., preferably from 80 to 120° C., pressures being from 1 to 10 bar, preferably from 1 to 3 bar, and the pH being <7 and decreasing in the course of the reaction.

The reaction mixture present after the first etherification stage is then rendered alkaline by adding a suitable inorganic base, for example aqueous NaOH or KOH solution with the result that further hydroxymethylations take place. A pH of >9.5 is established; it is preferably in a range from 10 to 11.

The reaction mixture present after the etherification, preferably a methanolic melamine-formaldehyde condensation solution, is then subjected to at least one distillation step. Here, volatile constituents, in particular excess methanol, are removed. This distillation step can preferably be carried out as a vacuum distillation, pressures of from 1000 to 0.1 mbar, preferably from 1000 to 10 mbar, and temperatures of from 30 to 70° C. prevailing.

A further distillation step may follow, it being possible to remove part of the water and of the excess formaldehyde.

In order to achieve as complete a conversion as possible of the melamine to hexahydroxymethylmelamine, the prior art discloses carrying out further methylolation and etherification steps with appropriate setting of an alkaline pH and addition of 0.01-3 mol, preferably 0.01-1 mol, of formaldehyde per mole of melamine, over a time of from 10 to 120 min., preferably from 10 to 60 min, temperatures of from 30 to 100° C., preferably from 30 to 70° C., and pressures of from 0.5 to 10 bar, preferably from 1 to 3 bar. Identical or different alcohols can be used thereby for the further etherification steps with the result that mixed etherification products are formed. Concentration steps by means of distillation steps may follow. With increasing degree of hydroxymethylation of the melamine, however, the system proves to be more difficult to handle. In particular, a procedure in a vessel is increasing complicated by rising viscosity at the reaction mixture until it is no longer feasible. The hexahydroxymethylmelamine proportion present as a solid, which should be as high possible according to the invention, can be thoroughly mixed by a stirrer only with difficulty.

The reactions are preferably carried out in a stirred vessel, sufficient mixing in the system being achievable by a suitable choice of stirrer used and of the energy input.

In an embodiment according to the invention, further hydroxymethylation steps result, preferably at the first: etherification stage, owing to the excess of formaldehyde present.

It has been found here that the methanol present in the hydroxymethylation intermediate greatly reduces the reactivity of the formaldehyde owing to hemiacetal formation which takes place. Thus, the hydroxymethylation is particularly effectively designed with respect to a high degree of substitution if the excess methanol is removed beforehand from the solution by a suitable distillation step. Moreover, the hydroxymethylation takes place in particular in an alkaline pH range. However, it has been found that the pH decreases during a distillation stage for removing the methanol, probably as a result of a Cannizzaro reaction, i.e. the disproportionation of formaldehyde into methanol and formic acid. In addition to the effect on the pH of the solution, the available proportion of formaldehyde likewise decreases.

For the process according to the invention, it is accordingly important that pH of the reaction mixture be >10 after the removal of the methanol by a distillation step. This can achieved by adding, before the methanol distillation, an amount of base such that a corresponding pH can be maintained. Alternatively, addition metering of base during and/or after the methanol distillation can be provided.

In addition, it has been found that a more rapid distillation process is particularly suitable for keeping the pH in the desired alkaline range during the methanol distillation.

The distillation is particularly advantageously carried out in falling-film evaporators, thin-film evaporators and SAMBAY thin-film evaporators. This last evaporation type with mechanically produced liquid layers or liquid films is particularly suitable for temperature-sensitive solutions and in general for the distillation of highly viscose, high-boiling solutions. The liquid to be evaporated is distributed by means of movable wipers or rigid stirrer blades of a rotor as a thin layer over a preferably cylindrical heat exchange surface so that as a result an increasing viscosity of the solution to be evaporated does not give rise to any problems in carrying out the process.

Moreover, metering of a large amount of base before the methanol distillation proves to be advantageous for maintaining a pH of >10, preferably >11, after the distillation step.

If required, a second metering of base can also be carried out after the methanol distillation.

In the process according to the invention, a first methylolation and etherification stage with subsequent methanol distillation is followed by further reaction steps for methylolation and etherification, in which the reaction mixture, the methanolic melamine/formaldehyde condensate solutions, are condensed with methanol in an acidic pH range, preferably from 2.5 to 3.5, at a reaction temperature from 40 to 120° C., preferably from 40 to 70° C., for a duration of from 10 to 60 min, preferably from 10 to 30 min. Before, during or after the subsequent methanol distillation, the system is rendered alkaline. The distillation is effected at temperatures of from 30 to 120° C., preferably from 40 to 70° C., and pressures of from 1000 to 0.01 mbar, preferably from 1000 to 10 mbar.

A multistage process has proven advantageous for achieving as high a degree of hydroxymethylation as possible of the etherified melamine/formaldehyde condensate. In particular, the removal of excess methanol from the system and maintenance of an alkaline pH increases the effectiveness of the respective hydroxymethylation steps. This multistage procedure avoids the problems of the handling of the reaction mixture which arise out of the increasing solids content with progressive degree of hydroxymethylation.

The use, according to the invention, of further hydroxymethylation steps with a subsequent methanol distillation in each case and targeted control of the pH before, during and after the methanol distillation makes it possible to achieve a high degree of hydroxymethylation in an etherified melamine/formaldehyde condensate.

According to the invention, the effect which the degree of substitution has on the viscosity of the end product to be achieved is also utilized. With increasing degree of hydroxymethylation, the viscosity of the end product decreases, with the result that subsequent processing steps and potential uses of the etherified melamine/formaldehyde condensate according to the invention, for example as acid-curable crosslinking agents for binder systems containing hydroxyl groups for clearcoats, color coats, wood coating, paper strengthening or coil coating, are simplified and extended.

The present invention is now explained in more detail with reference to a working example. Unless expressly stated otherwise, all data on parts and percentages are weight data. After each etherification step, the degree of substitution and etherification have been analyzed on the basis of selected peaks and HPLC and the solids content and the viscosity have been measured.

The nomenclature of the X/Y/Z derivatives is as follows:
X corresponds to mole of melamine
Y corresponds to mole of formaldehyde and
Z corresponds to mole of methanol.

For example, the data 1/7/6 means that 7 mol of formaldehyde and 6 mol of methanol are incorporated per mole of melamine. This indicates that a further formaldehyde attacks an existing hydroxymethyl group, with the result that a small polyoxymethyl chain is formed.

EXAMPLE 1

375 g of a 40% strength aqueous formaldehyde solution are initially taken in a reaction vessel and adjusted to a pH of 9 with NaOH in the form of a 25% strength aqueous solution. After addition of 70 g of melamine, the reaction mixture is heated to 70° C. and stirred from 50° C. for 40 minutes. The hydroxymethylation intermediate obtained is then diluted with 167 g of methanol, adjusted to a pH of 3 with 3.2 ml of 30% strength aqueous $HNO_3$ solution and etherified at 60° C. for 30 minutes. The etherification reaction is terminated by addition of 2.8 ml of a 25% strength sodium hydroxide solution, that adjusts a pH of >10. Excess methanol is distilled off in vacuo at a pressure of 80 mbar and a temperature of 90° C.

The solids content, which is determined by drying in a drying oven at 120° C. for two hours, is 78.1%, the water content is 3% and the viscosity is determined at 75 000 mPa·s.

The HPLC analysis gives the following derivatives, the remainder being dimeric and higher molecular weight and it has not been possible to assign them as individual species:

| 1/4/4 | 1/5/4 | 1/6/4 | 1/5/5 | 1/6/5 | 1/6/6 | 1/7/6 | 2/X/X | (mol/mol/mol |
|---|---|---|---|---|---|---|---|---|
| 1.7 | 7.4 | 11.9 | 3.9 | 11.5 | 6.4 | 1.8 | 7.1 | (% by area) |

It is found that the substitution is still not very complete and only 50% of the product are identified while the remainder cannot be assigned.

The etherified melamine/formaldehyde condensate obtained is then diluted with 267 g of methanol, the pH is adjusted to 3 with 1.8 ml of 30% strength aqueous $HNO_3$ solution and condensation is effected at a temperature of 60° C. for 12 minutes. Thereafter, a pH of 10.5 is established in the reaction mixture by addition of 1.5 ml of 25% strength aqueous NaOH solution and the excess methanol is distilled off in vacuo at a pressure of 120 mbar and a temperature of 90° C. The solids content determined in the drying oven (120° C., t=2 h) is now 95.4%, the water content is 0.8% and the viscosity is 15 500 mPa·s.

The HPLC analysis gives the following results:

| 1/4/4 | 1/5/4 | 1/6/4 | 1/5/5 | 1/6/5 | 1/6/6 | 1/7/6 | 2/X/X | (mol/mol/mol) |
|---|---|---|---|---|---|---|---|---|
| 0.3 | 1.3 | 1.9 | 5 | 13.3 | 18.1 | 5.2 | 46.5 | (% by area) |

The product is then diluted again with 267 g of methanol, at a pH setting of 3 by 1.2 ml of 30% strength aqueous $HNO_3$ solution. The condensation takes place at a temperature of 60° C. for 12 minutes. Thereafter, the solution is rendered alkaline with 0.9 ml of a 25% strength aqueous NaOH solution and the excess methanol is distilled off in vacuo at a pressure of 120 mbar and a temperature of 90° C.

The solids content, which is determined by drying in a drying oven at 120° C. for 2 hours, is now 97.8%, the water content is 0.5% and the viscosity is determined at 6400 mPa·s.

The HPLC analysis gives the following result:

| 1/4/4 | 1/5/4 | 1/6/4 | 1/5/5 | 1/6/5 | 1/6/6 | 1/7/6 | 2/X/X | (mol/mol/mol) |
|---|---|---|---|---|---|---|---|---|
| 0.4 | 1.7 | 0.9 | 0.6 | 9 | 31.9 | 8 | 28.2 | (% by area) |

The example clearly shows that the proportions of completely etherified product increase from stage to stage (1/4/4, 1/5/5, 1/6/6), at the same time the viscosity of the reaction mixture decreasing from 75 000 mPa·s to 6400 mPa·s.

We claim:

1. A process for the preparation of etherified melamine/formaldehyde condensates, which consists of:
   (a) methylolating melamine with a formaldehyde component in the molar ratio of from 1:6 to 1:15 melamine:formaldehyde at a pH of >7 in a first reaction step at 40 to 100° C.;
   (b) etherifying a hydroxyl methylation intermediate formed in step (a) at 40 to 120° C. with methanol at a pH of <4.5 in a subsequent second reaction step;
   (c) in a third reaction step, adjusting the reaction mixture from step (b) to a pH of >10 by adding an inorganic base with the result that further hydroxymethylations take place and removing methanol by at least one distillation step the pH being maintained at more than 10; and
   (d) repeating the reaction steps (b) and (c) at least once whereupon further hydroxymethylation steps result owing to the excess of formaldehyde present.

2. The process for the preparation of etherified melamine/formaldehyde condensates according to claim 1, wherein methanol is removed in step (c) by a distillation step.

3. The process for the preparation of etherified melamine/formaldehyde condensates according to claim 1, wherein the at least one distillation step of reaction step (c) is carried out in a falling-film, thin-film or SAMBAY evaporator.

4. An etherified melamine/formaldehyde condensate, prepared by the process according to claim 1, wherein a proportion of mononuclear components having a degree of substitution of <6 is less than 10%, based on the total amount of melamine/formaldehyde condensate.

5. An etherified melamine/formaldehyde condensate, prepared by the process according to claim 1, wherein the solids content is more than 96%.

6. An etherified melamine/formaldehyde condensate, prepared by the process according to claim 1, wherein the viscosity is less than 3000 mPa·s.

7. A method of crosslinking a binder system containing hydroxyl groups wherein an etherified melamine/formaldehyde condensate prepared according to claim 1 is used as acid-curable crosslinking agent.

8. The process for the preparation of etherified melamine/formaldehyde condensates according to claim 2, wherein the at least one distillation step of reaction step (c) is carried out in a falling-film, thin-film or SAMBAY evaporator.

9. An etherified melamine/formaldehyde condensate, prepared by the process according to claim 1, wherein a proportion of mononuclear components having a degree of substitution of <6 is less than 10%, based on the total amount of melamine/formaldehyde condensate.

10. An etherified melamine/formaldehyde condensate, prepared by the process according to claim 2, wherein a proportion of mononuclear components having a degree of substitution of <6 is less than 10%, based on the total amount of melamine/formaldehyde condensate.

11. An etherified melamine/formaldehyde condensate, prepared by the process according to claim 3, wherein a proportion of mononuclear components having a degree of substitution of <6 is less than 10%, based on the total amount of melamine/formaldehyde condensate.

12. An etherified melamine/formaldehyde condensate, prepared by the process according to claim 1, wherein the solids content is more than 96%.

13. An etherified melamine/formaldehyde condensate, prepared by the process according to claim 2, wherein the solids content is more than 96%.

14. An etherified melamine/formaldehyde condensate, prepared by the process according to claim 3, wherein the solids content is more than 96%.

15. An etherified melamine/formaldehyde condensate, prepared by the process according to claim 1, wherein the viscosity is less than 3000 mPa·s.

16. An etherified melamine/formaldehyde condensate, prepared by the process according to claim 2, wherein the viscosity is less than 3000 mPa·s.

17. An etherified melamine/formaldehyde condensate, prepared by the process according to claim 3, wherein the viscosity is less than 3000 mPa·s.

18. The process according to claim 1, wherein the melamine and formaldehyde in step a are present in a molar ratio of from 1:7 to 1:10.

* * * * *